(12) United States Patent
Araki et al.

(10) Patent No.: US 6,794,027 B1
(45) Date of Patent: Sep. 21, 2004

(54) THIN COATING FILM COMPRISING FLUORINE-CONTAINING POLYMER AND METHOD OF FORMING SAME

(75) Inventors: Takayuki Araki, Settsu (JP); Yoshito Tanaka, Settsu (JP); Masahiro Kumegawa, Kagawa (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/763,412

(22) PCT Filed: Aug. 20, 1999

(86) PCT No.: PCT/JP99/04472

§ 371 (c)(1),
(2), (4) Date: Feb. 22, 2001

(87) PCT Pub. No.: WO00/11093

PCT Pub. Date: Mar. 2, 2000

(30) Foreign Application Priority Data

Aug. 24, 1998 (JP) .......................................... 10/237749

(51) Int. Cl.$^7$ .......................... B32B 27/08; B32B 27/30; B32B 31/26
(52) U.S. Cl. ....................... 428/336; 428/421; 428/422; 427/385.5
(58) Field of Search ................................. 524/544, 545, 524/546; 428/336, 421, 422; 427/385.5

(56) References Cited

U.S. PATENT DOCUMENTS

| | | | |
|---|---|---|---|
| 4,544,720 A | 10/1985 | Ohmori et al. | 526/247 |
| 5,059,720 A | 10/1991 | Hung | 568/674 |
| 5,304,617 A | 4/1994 | Kodama et al. | 526/255 |
| 5,374,683 A | 12/1994 | Morgan | 525/200 |
| 5,570,593 A | 11/1996 | Neher et al. | 66/132 R |
| 5,670,593 A | 9/1997 | Araki et al. | 526/245 |
| 5,750,626 A | 5/1998 | Shimizu et al. | 525/151 |
| 5,869,574 A | 2/1999 | Shimizu et al. | 525/151 |
| 5,986,150 A | 11/1999 | Araki et al. | 568/843 |
| 6,054,537 A | 4/2000 | Shimizu et al. | 525/189 |
| 6,069,215 A | 5/2000 | Araki et al. | 526/245 |
| 6,207,236 B1 * | 3/2001 | Araki et al. | 427/386 |
| 6,225,399 B1 | 5/2001 | Araki et al. | 524/544 |
| 6,479,161 B1 | 11/2002 | Araki et al. | 428/515 |
| 6,479,578 B2 | 11/2002 | Araki et al. | 524/517 |
| 6,500,537 B1 | 12/2002 | Araki et al. | 428/355 EN |
| 6,552,127 B1 | 4/2003 | Shimizu et al. | 525/148 |
| 2003/0008151 A1 | 1/2003 | Araki et al. | 428/421 |
| 2003/0049454 A1 | 3/2003 | Araki et al. | 428/421 |

FOREIGN PATENT DOCUMENTS

| | | | |
|---|---|---|---|
| JP | 9-157578 | | 6/1997 |
| JP | 63-54409 | | 3/1998 |
| WO | WO97/21776 | | 6/1997 |
| WO | WO 97/21776 | * | 6/1997 |
| WO | WO 97/21779 | | 6/1997 |
| WO | 97/48774 | | 12/1997 |
| WO | WO 9748774 A1 | * | 12/1997 |
| WO | WO 98/50229 | * | 11/1998 |

OTHER PUBLICATIONS

English language translation of WO 97/48774, Dec. 1997.*
International Search Report for PCT/JP99/04472, dated Nov. 9, 1999.

* cited by examiner

Primary Examiner—Ramsey Zacharia
(74) Attorney, Agent, or Firm—Sughrue Mion, PLLC

(57) ABSTRACT

To provide the method of forming the thin coating film of fluorine-containing polymer having heat resistance and non-sticking property by adhering directly to a substrate without lowering characteristics such as reflection and light transmission which the substrate has. The thin coating film is a film which comprises a continuous layer of fluorine-containing polymer formed by adhering directly to the substrate and has a thickness of less than 3 μm, wherein the fluorine-containing polymer in the coating film has a hydrophilic functional group and a crystalline melting point of not less than 200° C.

14 Claims, No Drawings

THIN COATING FILM COMPRISING FLUORINE-CONTAINING POLYMER AND METHOD OF FORMING SAME

TECHNICAL FIELD

The present invention relates to a coating film adhering to a substrate in a state that transparency of a continuous layer of specific fluorine-containing polymer having heat resistance and non-sticking property is maintained, particularly to a coating film having a thinned layer of fluorine-containing polymer and to a method of forming the thin coating film of fluorine-containing polymer.

BACKGROUND ART

Fluorine-containing polymers are excellent particularly in heat resistance, stain-proofing property, non-sticking property, weather resistance, chemical resistance and insulating property and have a low refraction index, and therefore a coating composition and film which are obtained from the fluorine-containing polymer are used or desired to be used for various applications. Particularly perfluoro fluorine-containing resins represented by PTFE, PFA and FEP which have a high heat resistance (not less than 300° C.) and a high melting point (not less than 250° C.) have the above-mentioned properties at the highest levels, and it can be said that they are the most suitable materials.

On the other hand, on a heat radiation plate and reflection plate of heating apparatuses equipped with a heater such as an electric stove, gas stove and petroleum stove and inner walls of cooking apparatuses such as a range with oven, oven and toaster and fish oven, in order not to release heat (radiation heat) or in order to focus heat on a certain point, materials such as hot-dipped aluminum-coated steel plate having a metal gloss by brightening treatment and stainless steel plate, mirror, etc. having a high reflectance are used. Those materials are desired to be coated with a fluorine-containing polymer having heat resistance, non-sticking property and stain-proofing property not to lower heat reflectance of a substrate. For that purpose, it is desirable to coat a fluorine-containing polymer having the above-mentioned properties on the substrate so that a coating film is transparent and as thin as possible.

However those fluorine-containing polymers have a substantial problem that adhesion to a substrate such as metal is not enough due to excellent non-sticking property thereof to be utilized. Examples of a method of allowing the fluorine-containing polymer to adhere to a metal substrate, etc. are as follows.

1. A method of physically roughening a surface of the substrate by sand blasting or the like.
2. A method of providing a primer layer mainly comprising heat resistant engineering plastic, metal powder, or the like between the substrate and the fluorine-containing polymer.
3. A method of forming fluorine-containing polymer into a film and carrying out chemical treatment such as sodium etching on an adhering surface of the film.
4. A method of using an adhesive.

It is known that those methods are carried out individually or in combination thereof. However only by the method 1, adhesion is insufficient, and peeling arises only by environmental change in temperature and humidity. In the method 2, the primer layer is colored, and therefore only by providing the primer layer, a feature of the substrate such as reflectance is lost. Also in the method 3, coloration of the film occurs, which lowers appearance and features of the substrate, and even if treatment for making a transparent surface can be conducted, adhesion is insufficient and the film is peeled due to thermal deformation when used at high temperature. Accordingly the method 3 must be combined with the methods 1, 2 and 4, and a feature of the substrate is lost as mentioned above. With respect to the method 4, since an adhesive itself has no transparency or its heat resistance is insufficient, the adhesive is colored or whitened when used at high temperature and foaming and peeling arise.

Namely a transparent coating film formed by allowing a fluorine-containing polymer having heat resistance and non-sticking property to adhere directly to a substrate without lowering properties of fluorine has not been obtained.

Further a fluorine-containing polymer having heat resistance and non-sticking property is selected from those being insoluble in a solvent and having a high crystalline melting point, and it is difficult to attain another object of the present invention, namely to allow a transparent continuous layer of those fluorine-containing polymers to adhere to a substrate by making a thickness of the layer extremely thin. In the above-mentioned conventional methods of providing an adhesive layer, a thin coating film has not been obtained.

In view of the facts mentioned above, an object of the present invention is to provide a method of forming a thin coating film of a fluorine-containing polymer having heat resistance and non-sticking property by adhering the fluorine-containing polymer directly to a substrate without lowering a reflectance and light transmissivity of the substrate. Another object is to provide the thin coating film of fluorine-containing polymer which is obtained by applying the fluorine-containing polymer directly to the substrate by the forming method.

DISCLOSURE OF INVENTION

The present invention relates to the thin coating film having a thickness of less than 3 μm which comprises a continuous layer of fluorine-containing polymer formed directly on a substrate by adhesion and is characterized in that the fluorine-containing polymer in the coating film has a hydrophilic functional group and a crystalline melting point of the fluorine-containing polymer is not less than 200° C.

In that case, it is preferable that a thickness of the coating film comprising the continuous layer of fluorine-containing polymer is not more than 2 μm, more preferably not more than 1 μm.

Also it is preferable that the crystalline melting point of the fluorine-containing polymer in the coating film is not less than 300° C.

It is preferable that the hydrophilic functional group is at least one of hydroxyl, carboxyl, salt of carboxylic acid, sulfonic acid group or salt of sulfonic acid.

Also it is preferable that the fluorine-containing polymer having a hydrophilic functional group is a fluorine-containing polymer prepared by copolymerizing (a) 0.05 to 50% by mole of at least one of ethylenic monomers having any functional group selected from hydroxyl, carboxyl, salt of carboxylic acid, sulfonic acid group or salt of sufonic acid with (b) 50 to 99.95% by mole of fluorine-containing ethylenic monomer having no functional group mentioned above.

It is preferable that the ethylenic monomer (a) having functional group is at least one of fluorine-containing ethylenic monomers having any functional group selected from hydroxyl, carboxyl, salt of carboxylic acid, sulfonic acid group or salt of sulfonic acid.

Further the present invention relates to an aqueous dispersion for forming the above-mentioned thin coating film which comprises 0.1 to 70% by weight of fluorine-containing polymer having hydrophilic functional group in the form of fine particles having a particle size of 1 to 200 nm and 30 to 99.9% by weight of water.

Still further the present invention relates to a method of forming the above-mentioned thin coating film, which is characterized in that after the above-mentioned aqueous dispersion is coated on a substrate, sintering is carried out at a temperature of not less than a crystalline melting point of the contained fluorine-containing polymer.

BEST MODE FOR CARRYING OUT THE INVENTION

As a result of intensive studies made to attain the above-mentioned objects, the inventors of the present invention have found that the above-mentioned coating film comprising a continuous layer of fluorine-containing polymer can be adhered directly on a substrate and the coating film can be formed as an extremely thin layer having a thickness of less than 3 μm, further not more than 2 μm when a specific fluorine-containing polymer having heat resistance and non-sticking property is used and coated by a specific method.

Further the resulting coating film is high in transparency and can be formed without lowering reflectance and light transmissivity of the substrate.

The present invention relates to a novel thin coating film comprising a continuous layer of fluorine-containing polymer adhered directly to a substrate.

The thin coating film comprising a continuous layer of fluorine-containing polymer of the present invention is a continuous coating film comprising a matrix fluorine-containing polymer and is preferably a coating film which basically comprises only a fluorine-containing polymer and is formed in the form of film. In that coating film, excellent surface characteristics such as non-sticking property, stain-proofing property, water repellency and friction property of the fluorine-containing polymer can be used most effectively.

Also in the continuous layer comprising a matrix fluorine-containing polymer can be dispersed an inorganic or organic filler in a range not lowering transparency of the coating film and excellent characteristics of the fluorine-containing polymer. For example, for the purpose to improve mechanical properties and abrasion resistance of the coating film, a silica (colloidal silica, etc.) in the form of fine particles and a heat resistant resin (polyimide, polyether sulphone, polyamideimide, or the like) may be dispersed in the coating film.

In the thin coating film of the present invention, the fluorine-containing polymer therein contains a hydrophilic functional group in its molecular structure and has a crystalline melting point of not less than 200° C. The thin coating film of the present invention is a coating film having a thickness of less than 3 μm and comprising a continuous layer of such a fluorine-containing polymer and is obtained by adhering the film directly to the substrate.

In the present invention, the hydrophilic functional group in the fluorine-containing polymer means a functional group having an ability of ion-bonding and hydrogen-bonding with water molecule. Examples thereof are groups having atoms of oxygen, nitrogen, sulfur, or the like such as hydroxyl, carboxyl, salt of carboxylic acid, sulfonic acid group, salt of sulfonic acid, carbonyl group and amino group. Among them, hydroxyl, carboxyl, salt of carboxylic acid, sulfonic acid group and salt of sulfonic acid are preferred. By an effect of those hydrophilic functional group, a uniform thin transparent coating film can be obtained even in case of a fluorine-containing polymer having a high melting point and being insoluble in a solvent.

At the same time, by an effect of those hydrophilic functional groups, a strong adhesion to the substrate can be given.

It is preferable that the fluorine-containing polymer having a hydrophilic functional group is a fluorine-containing polymer prepared by copolymerizing (a) 0.05 to 50% by mole of at least one of ethylenic monomers having any functional group selected from the above-mentioned hydrophilic functional groups and (b) 50 to 99.95% by mole of fluorine-containing ethylenic monomer having no functional group mentioned above. Further it is preferable that the ethylenic monomer (a) having functional group is at least one of fluorine-containing ethylenic monomers having any functional group selected from hydroxyl, carboxyl, salt of carboxylic acid, sulfonic acid group or salt of sulfonic acid from the viewpoint of not lowering heat resistance and non-sticking property of the thin coating film.

Further from the viewpoint of heat resistance, hydroxyl group is most preferable. Among them, it is preferable that the monomer (a) is the fluorine-containing ethylenic monomer having the above-mentioned hydrophilic functional group.

It is preferable that the above-mentioned fluorine-containing ethylenic monomer (a) having a hydrophilic group which constitutes the fluorine-containing polymer having a hydrophilic group is a fluorine-containing ethylenic monomer having functional group which is represented by the formula (1):

$$CX_2=CX^1-R_f-Y \tag{1}$$

wherein Y is —CH$_2$OH, —COOH, salt of carboxylic acid, —SO$_3$H or salt of sulfonic acid, X and X$^1$ are the same or different and each is hydrogen atom or fluorine atom, R$_f$ is a divalent fluorine-containing alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms.

Examples of the fluorine-containing ethylenic monomer (a) having hydrophilic group are monomer represented by the formula (2):

$$CF_2=CF-R_f^2-Y \tag{2}$$

wherein Y is as defined in the above formula (1), R$_f^2$ is a divalent fluorine-containing alkylene group having 1 to 40 carbon atoms or OR$_f^3$, in which R$_f^3$ is a divalent fluorine-containing alkylene group having 1 to 40 carbon atoms or a divalent fluorine-containing alkylene group having ether bond and 1 to 40 carbon atoms, monomer represented by the formula (3):

$$CF_2=CFCF_2-OR_f^4-Y \tag{3}$$

wherein Y is as defined in the above formula (1), $R_f^4$ is a divalent fluorine-containing alkylene group having 1 to 39 carbon atoms or a divalent fluorine-containing alkylene group having ether bond and 1 to 39 carbon atoms, monomer represented by the formula (4):

$$CH_2=CFCF_2-R_f^5-Y \tag{4}$$

wherein Y is as defined in the above formula (1), $R_f^5$ is a divalent fluorine-containing alkylene group having 1 to 39 carbon atoms or $OR_f^6$, in which $R_f^6$ is divalent fluorine-containing alkylene group having 1 to 39 carbon atoms or a divalent fluorine-containing alkylene group having ether bond and 1 to 39 carbon atoms, monomer represented by the formula (5):

$$CH_2=CH-R_f^7-Y \tag{5}$$

wherein Y is as defined in the above formula (1), $R_f^7$ is a divalent fluorine-containing alkylene group having 1 to 40 carbon atoms, and the like monomer.

From the viewpoint that copolymerizability with the fluorine-containing ethylenic monomer (b) having no functional group is comparatively good and that heat resistance of the polymer obtained by the copolymerization is not lowered remarkably, the fluorine-containing ethylenic monomers having hydrophilic group which are represented by the formulae (2) to (5) are preferable.

Among them, from the viewpoint of copolymerizability with the fluorine-containing ethylenic monomer (b) having no functional group and heat resistance of the obtained polymer, the compounds of the formulae (2) and (4) are preferable, and the compound of the formula (4) is particularly preferable.

Examples of the fluorine-containing ethylenic monomer having hydrophilic group and represented by the formula (2) are:

$CF_2=CFOCF_2CF_2CH_2OH$, $CF_2=CFO(CF_2)_3COOH$, $CF_2=CFOCF_2CF_2SO_3H$, $CF_2=CFOCF_2CFOCF_2CF_2CH_2OH$,
$\phantom{CF_2=CFOCF_2CF_2SO_3H, CF_2=CFOCF_2}|$
$\phantom{CF_2=CFOCF_2CF_2SO_3H, CF_2=CFOCF_2}CF_3$ $CF_2=CFCF_2COOH$, $CF_2=CFCF_2CH_2OH$, $\phantom{CF_2=CFOCF_2}CF_3$
$\phantom{CF_2=CFOCF_2}|$
$CF_2=CFOCF_2CFOCF_2CF_2SO_3H$, and the like.

Examples of the fluorine-containing ethylenic monomer having hydrophilic group and represented by the formula (3) are:

$CF_2=CFCF_2OCF_2CF_2CF_2COOH$, $CF_2=CFCF_2OCF_2CF_2CF_2SO_3H$, and the like.

Examples of the fluorine-containing ethylenic monomer having hydrophilic group and represented by the formula (4) are:

$CH_2=CFCF_2CF_2CH_2CH_2OH$, $CH_2=CFCF_2CF_2COOH$, $CH_2=CF(CF_2CF_2)_2-COOH$, $CH_2=CFCF_2OCFCH_2OH$,
$\phantom{CH_2=CF(CF_2CF_2)_2-COOH, CH_2=CFCF_2OCFCH_2}|$
$\phantom{CH_2=CF(CF_2CF_2)_2-COOH, CH_2=CFCF_2OCFCH_2}CF_3$ -continued
$CH_2=CFCF_2OCFCOOH$, $CH_2=CFCF_2OCFCF_2OCFCH_2OH$,
$\phantom{CH_2=CFCF_2OCF}|$ $\phantom{CH_2=CFCF_2OCFCF_2O}|\phantom{CF_2O}|$
$\phantom{CH_2=CFCF_2OCF}CF_3$ $\phantom{CH_2=CFCF_2OCFCF_2O}CF_3\phantom{CF_2O}CF_3$ and the like.

Examples of the fluorine-containing ethylenic monomer having hydrophilic group and represented by the formula (5) are:

$CH_2=CHCF_2CF_2CH_2CH_2COOH$, $CH_2=CH(CF_2)_nCH_2CH_2CH_2OH$, and the like.

In addition, there are $\phantom{CH_2=CHCH_2}CF_3$
$\phantom{CH_2=CHCH_2}|$
$CH_2=CHCH_2C-OH$,
$\phantom{CH_2=CHCH_2}|$
$\phantom{CH_2=CHCH_2}CF_3$ and the like.

The fluorine-containing ethylenic monomer (b) having no functional group mentioned above which is copolymerized with the fluorine-containing ethylenic monomer (a) having hydrophilic group can be selected optionally from known monomers and imparts heat resistance, chemical resistance, non-sticking property, stain-proofing property and friction property to the fluorine-containing polymer.

Examples of the fluorine-containing ethylenic monomer (b) are tetrafluoroethylene, a monomer represented by the formula (6): $CF_2=CF-R_f^8$, wherein $R_f^8$ is $CF_3$ or $OR_f^9$, in which $R_f^9$ is a perfluoroalkyl group having 1 to 5 carbon atoms, chlorotrifluoroethylene, vinylidene fluoride, vinyl fluoride, hexafluoroisobutene, $CH_2=CF-(CF_2)_nX^2$, $CH_2=CH-(CF_2)_nX^2$, wherein $X^2$ are selected from hydrogen atom, chlorine atom and fluorine atom, n is an integer of 1 to 5, and the like.

In addition to the fluorine-containing ethylenic monomer (a) having hydrophilic group and the fluorine-containing ethylenic monomer (b) having no functional group mentioned above, an ethylenic monomer having no fluorine atom may be copolymerized in the range of not lowering heat resistance and non-sticking property. In that case, it is preferable that the ethylenic monomer having no fluorine atom is selected from ethylenic monomers having not more than 5 carbon atoms in order not to lower heat resistance. Examples of such an ethylenic monomer are ethylene, propylene, 1-butene, 2-butene, and the like.

A content of the fluorine-containing ethylenic monomer (a) having functional group in the fluorine-containing ethylenic polymer having hydrophilic group which is used in the present invention is from 0.05 to 50% by mole on the basis of the total amount of monomers in the polymer. The content is optionally selected depending on kind of the thin coating film of the present invention, shape of the coating film, coating method, film forming method and conditions and further depending on purposes and applications. The content of the fluorine-containing ethylenic monomer (a) is preferably from 0.05 to 20% by mole, particularly preferably from 0.1 to 10% by mole.

When the content of the fluorine-containing ethylenic monomer (a) having hydrophilic group is less than 0.05% by mole, transparency of the coating film is insufficient, sufficient adhesion to the substrate surface is difficult to obtain, and separation easily occurs due to temperature change and permeation of chemicals. When more than 50% by mole, heat resistance is lowered and there occur adhesion failure, coloring, foaming and pin hole at sintering at high temperature or during use at high temperature, thus easily lowering property for exhibiting clear surface pattern and causing separation of a coating layer and elution due to decomposition.

The above-mentioned fluorine-containing polymers having hydrophilic group can be prepared by copolymerizing the fluorine-containing ethylenic monomer (a) having hydrophilic group and the fluorine-containing ethylenic monomer (b) having no hydrophilic group through known polymerization methods. Among them, radical copolymerization method is mainly used. Namely means for initiating the polymerization is not particularly limited if the polymerization advances radically. For example, the polymerization is initiated by an organic or inorganic radical polymerization initiator, heat, light, ionizing radiation, etc. The polymerization can be carried out by solution polymerization, bulk polymerization, suspension polymerization, emulsion polymerization, or the like. A molecular weight of the polymer is regulated by a concentration of the monomers used in the polymerization, a concentration of the initiator, a concentration of a chain transfer agent and polymerization temperature. Amounts of components of the prepared fluorine-containing polymer can be regulated by amounts of monomers used.

It is preferable that the coating film comprising the fluorine-containing polymer has a crystalline melting point of as high as not less than 200° C. When the melting point is too low, the coating film is melted during use at high temperature and a shape thereof cannot be maintained stable and also a mechanical strength of the coating film is lowered remarkably, which lowers abrasion resistance of the coating film and causes the coating film to be easily scratched. The crystalline melting point is preferably not less than 250° C., particularly not less than 300° C. though it depends on applications. According to the present invention, even those fluorine-containing polymers having a high melting point make it possible to form a uniform transparent coating film, and further can be used at high temperature.

It is preferable that the fluorine-containing polymer in the thin coating film of the present invention has a sufficient heat resistance. For example, preferred is a fluorine-containing polymer having 1% weight reduction temperature of not less than 300° C. in air when measured with a DTGA analyzer. In case of a fluorine-containing polymer having a low thermal decomposition temperature, for example, when it is used for a heater, cooking apparatuses for heating, and the like and exposed to high temperature, foaming, separation and coloration arise to lower transparency and uniformity of the coating film, and as a result, energy efficiency is lowered. The fluorine-containing polymer to be used in the present invention has a thermal decomposition temperature of preferably not less than 320° C., more preferably not less than 330° C. causing 1% weight reduction though it depends on actual applications. Thus the polymer can be used for various high temperature applications.

It is preferable that the thin coating film (a layer comprising a fluorine-containing polymer) of the present invention has a water contact angle of not less than 95 degrees on its surface. When the water contact angle is low, non-sticking property and stain-proofing property are inferior and foreign matter and stain stick during use, thereby lowering transmissivity and reflectance of light and heat. For applications to cooking apparatuses for heating, etc., where there is a high possibility of coherence of oil and foods and scorching, the water contact angle is preferably not less than 100 degrees, though it depends on applications.

Fluorine-containing polymers mainly comprising tetrafluoroethylene are preferred as a fluorine-containing polymer satisfying the above-mentioned requirements. Examples of the preferred fluorine-containing polymer having hydrophilic group used in the present invention are as follows. (I) A polymer comprising 0.05 to 50% by mole of the fluorine-containing ethylenic monomer (a) having hydrophilic group and 50 to 99.95% by mole of tetrafluoroethylene (PTFE type).

The polymer is the most excellent in heat resistance, chemical resistance and non-sticking property, and further is superior from the viewpoint of sliding property (friction resistance, abrasion resistance). (II) A polymer comprising 0.05 to 50% by mole of the fluorine-containing ethylenic monomer (a) having hydrophilic group based on the total amount of monomers, and further based on the total amount of monomers excluding the monomer (a), 85 to 99.7% by mole of tetrafluoroethylene and 0.3 to 15% by mole of the monomer represented by the formula (6):

$$CF_2=CF-R_f^8 \qquad (6)$$

wherein $R_f^8$ is selected from $CF_3$ or $OR_f^9$, in which $R_f^9$ is a perfluoroalkyl group having 1 to 5 carbon atoms. For example, there is a tetrafluoroethylene-perfluoro(alkyl vinyl ether) copolymer having hydrophilic group (PFA type), a tetrafluoroethylene-hexafluoropropylene polymer having hydrophilic group (FEP type) or a tetrafluoroethylene-perfluoro(alkyl vinyl ether)-hexafluoropropylene terpolymer having hydrophilic group.

The polymer has heat resistance, chemical resistance and non-sticking property nearly equivalent to those of the above-mentioned PTFE type (I), and further is superior from the points of possessing transparency and being melt-processable and from the viewpoint that even when coated in the form of coating, it is possible to make the coating film transparent and its surface smooth by heat. (III) A polymer comprising 0.05 to 50% by mole of the fluorine-containing ethylenic monomer (a) having hydrophilic group based on the total amount of monomers, and further based on the total amount of monomers excluding the monomer (a), 40 to 80% by mole of tetrafluoroethylene, 20 to 60% by mole of ethylene and 0 to 15% by mole of other copolymerizable monomer (ETFE type).

The polymer is superior from the viewpoint of excellent heat resistance, stain-proofing property, weather resistance and transparency, and further excellent mechanical strength, hardness and rigidity and from the point that film forming property is good and coating to a substrate such as a resin (lamination, etc.) is easy because of good melt-flowability.

The thin coating film of the present invention comprises less than 3 μm thick continuous layer of fluorine-containing polymer having the above-mentioned heat resistance and non-sticking property and is used in the form of laminated articles produced by adhering directly to various substrates. By providing the thin coating film of the present invention to a substrate, excellent characteristics such as heat resistance, non-sticking property, stain-proofing property, etc. of the fluorine-containing polymer can be given to applications where good transmissivity and reflectance of light and heat are required.

When the coating film is too thick, light and heat are lost when being passed through a layer of fluorine-containing polymer, and thereby desired transmissivity and reflectance cannot be obtained. Further from the viewpoint of transmission efficiency of light and heat, a thickness of the coating film is preferably not more than 2 μm, further preferably not more than 1 μm, especially not more than 0.5 μm, further not more than 0.1 μm which can be attained by the present invention.

In order to obtain the thin coating film of the present invention, the fluorine-containing polymer having hydrophilic group may be applied to the substrate in any form. When the fluorine-containing polymer having hydrophilic group is used in the form of coating (or surface treating agent), it is preferable because a thin film (a layer of fluorine-containing polymer) can be formed efficiently on the substrate as mentioned above. In case of a method of molding the fluorine-containing polymer in the form of film, it is difficult to adhere the fluorine-containing polymer film uniformly to the substrate in a thickness of less than 3 μm.

In order to obtain the thin coating film of the present invention, when the fluorine-containing polymer having hydrophilic group is applied in the form of coating (or surface treating agent) to the substrate, the fluorine-containing polymer can be used in the form of an aqueous dispersion, organic solvent dispersion, powder, organosol or aqueous organosol dispersion. From the point that a layer of the fluorine-containing polymer can be applied uniformly to the substrate and a thin film can be formed, it is preferable to employ the form of aqueous dispersion composition prepared by dispersing fine particles of the fluorine-containing polymer having hydrophilic functional group into water.

To the above-mentioned aqueous dispersion may be blended a surfactant in order to enhance dispersion stability of the fine particles. Also additives such as a defoaming agent, viscosity control agent and leveling agent may be added in the range not lowering transparency, transmissivity of light and heat, non-sticking property and heat resistance of a coating film.

In the aqueous dispersion composition, the fluorine-containing polymer is dispersed in the form of fine particles having a particle size of 0.001 to 1.0 μm. In order to apply the layer of fluorine-containing polymer more uniformly and form a thin layer, the particle size is preferably not more than 0.2 μm, particularly preferably not more than 0.1 μm.

A content of the fluorine-containing polymer in the aqueous dispersion composition is selected in the range of 1 to 70% by weight (hereinafter referred to as %), and in general is adjusted so as to be suitable for forming a thin film as mentioned above depending on a viscosity and a coating method of the composition. The content is preferably 5 to 60%, particularly preferably 5 to 50%.

The aqueous dispersion of the present invention can be prepared by various methods. For example, there are a method of finely pulverizing a powder of fluorine-containing polymer having functional group and prepared by suspension polymerization or the like and then dispersing the finely pulverized powder into an aqueous medium with a surfactant, a method of preparing a fluorine-containing aqueous dispersion at the same time of polymerizing by emulsion polymerization and as case demands, adding a surfactant and additives, and the like method. From the viewpoint of productivity and quality (making a particle size smaller and more uniform), preferred is the method of directly preparing the aqueous dispersion by emulsion polymerization.

A coating method is not limited particularly, and a usual coating method such as brush coating, spray coating, roll coating, flow coating, or the like may be employed. For the purpose of making a thin film like the present invention, a method of coating with a dip coater, spin coater, gravure coater, curtain coater, doctor knife coater, rod coater, transfer roll coater, reverse roll coater, or the like is preferable.

For example, a uniform thin layer of fluorine-containing polymer can be given to a structural article by coating the above-mentioned aqueous dispersion composition by those methods, drying and then baking at a temperature of not less than a melting point of the contained fluorine-containing polymer having hydrophilic group depending on kind thereof. When the PTFE type fluorine-containing polymer having hydrophilic group of the above-mentioned (I) is coated, the baking is carried out at a temperature of 330° to 410° C., preferably 350° to 400° C., particularly preferably 370° to 400° C. When the PFA type or FEP type perfluoro fluorine-containing polymer having hydrophilic group of the above-mentioned (II) is coated, the baking is carried out at a temperature of 300° to 410° C., preferably 310° to 380° C., particularly preferably 310° to 350° C.

The thin coating film of the present invention must be adhered to a substrate sufficiently. A necessary adhering force varies depending on application, location where it is used and environment. If an adhesive strength can be measured, preferred is a coating film having an adhesive strength of not less than 0.5 kgf/cm, more preferably 1.0 kgf/cm, particularly 1.5 kgf/cm in a test for peeling at an angle of 90 degrees to a substrate. When the direct measurement of the adhesive strength is difficult, it is preferable to satisfy any one of or all of the conditions that in a cross-cut test of a coated plate which is specified in JIS K5400, not less than 90/100 of cross-cut squares of a coating film are kept adhering (initial adhesion), that in an abrasion resistance test where rubbing is carried out by 100 turns or more at a load of 250 g/cm$^2$ by using a rubbing tester, adhered coating film remains unseparated (coating film having abrasion resistance) and that in a hot water dipping test of not less than 95° C., the coating film is kept adhering for 10 hours or more (coating film having durability).

In order to make a thin coating film of fluorine-containing polymer to adhere to a substrate and apply the coating film without lowering reflectance and transmissivity of the substrate, it is preferable to make the coating film of fluorine-containing polymer to directly adhere without providing a binder layer or the like between the coating film and the substrate. Example of a method therefor is a method of introducing a functional group contributing to adhesion to a substrate, into a molecular structure of the fluorine-containing polymer to be used for a fluorine-containing polymer layer.

Examples of the preferred functional group contributing to adhesion to a substrate are hydroxyl, carboxyl, salt of carbonic acid, carbonic acid halide group, carbonate group, acid amide group, amino acid, sulfonic acid group, sulfonic acid salt, sulfonic acid halide, epoxy, cyano group and the like. It is preferable that the fluorine-containing polymer has at least one of those functional groups at a molecular end or side chain thereof.

The hydrophilic functional group contained in the fluorine-containing polymer to be used for the thin coating film of the present invention acts effectively for forming the thin film and at the same time, has an effect of imparting a property for directly adhering to the substrate.

In order to strengthen adhesion of the fluorine-containing polymer having hydrophilic group which is used for the thin coating film of the present invention, a functional group (epoxy group, cyano group, or the like) for further imparting adhesive property other than the hydrophilic group may be introduced. Among them, hydroxyl group is preferable because heat resistance thereof is good and it is possible to rigidly adhere directly to the substrate without lowering transparency of the coating film. Like the above-mentioned fluorine-containing polymers having hydrophilic functional group, preferred is a copolymer of an ethylenic monomer having functional group imparting adhesive property with a fluorine-containing ethylenic monomer.

While it is a matter of fact that the thin coating film of the present invention comprising a continuous layer of fluorine-containing polymer may consist of a fluorine-containing polymer having hydrophilic functional group, the coating film may contain a fluorine-containing polymer having no functional group and a non-fluorine-containing material (inorganic material and organic material) in a range not lowering transparency and light and heat transmissivity of the coating film and adhesion to the substrate.

Particularly the coating film containing the fluorine-containing polymer having no functional group is preferred from a point that heat resistance and non-sticking property can be improved without lowering transparency and transmissivity of heat and light.

The thin coating film of the present invention comprising (A) the fluorine-containing polymer having hydrophilic functional group and (B) the fluorine-containing polymer having no functional group may be i) a thin coating film comprising at least two layers of a layer of (A) and layer of (B) and having a total thickness of less than 3 $\mu$m or ii) a thin coating film comprising a layer of mixed composition of (A) and (B) and having a thickness of less than 3 $\mu$m.

Among them, the thin coating film having a multi-layer structure like i), in which the layer of (A) is provided between the substrate and the layer of (B) is preferred from the viewpoint of making it possible to effectively utilize transparency and adhesive property of the layer (A) to the substrate and heat resistance, non-sticking property and stain-proofing property of the layer (B).

The fluorine-containing polymer having no functional group is selected from those having high heat resistance, non-sticking property and stain-proofing property, concretely selected preferably from those having a crystalline melting point or glass transition temperature of not less than 200° C., preferably not less than 250° C., further preferably not less than 300° C. and a water contact angle of not less than 95 degrees, particularly not less than 100 degrees.

Examples thereof are preferably PTFE, PFA, FEP, tetrafluoroethylene/perfluoro(alkyl vinyl ether)/hexafluoropropylene terpolymer, ETFE, and the like.

In the thin coating film of the present invention, in case of a multi-layer of (A) and fluorine-containing polymer (B) having no functional group or a layer of mixture thereof, the preferred fluorine-containing polymer (B) is one having no functional group and having the same structure as that of the fluorine-containing polymer (A) having functional group. Concretely when the polymer (A) is the above-mentioned (I) (PTFE type) or (II) (PFA and FEP type), it is preferable that the fluorine-containing polymer (B) is selected from PTFE, FEP, PFA and tetrafluoroethylene/perfluoro(alkyl vinyl ether)/hexafluoropropylene terpolymer.

Also when the polymer (A) is the above-mentioned (III) (ETFE type), it is preferable that the fluorine-containing polymer (B) is selected from ETFE.

By the combinations exemplified above, good adhesion to a substrate and transparency and heat and light transmissivity of the coating film can be obtained.

Particularly in case of applications (for example, cooking apparatuses, etc.) where heat resistance and non-sticking property at high temperature are required, preferred is a thin coating film which comprises (A) of PFA type or FEP type of the above-mentioned (II) and (B) of at least one selected from PTFE and PFA and is a multi-layer comprising at least two layers of (A) and (B), in which the layer of (A) is provided between the substrate and the layer of (B), from the viewpoint of giving good adhesion, heat resistance, non-sticking property, transparency and heat transmissivity, enhancing property for exhibiting a pattern of substrate and effectively improving energy efficiency.

The thin coating film of the present invention can be adhered to various substrates such as a metallic substrate, ceramic substrate and resin substrate. The substrate is selected depending on application.

Metal of the metallic substrate encompasses metal, alloys of two or more metals, metal oxide, metal hydroxide, metal salts such as carbonate and sulfate, etc. Among them, metal, metal oxide and alloys are more preferable from the viewpoint of adhesive property.

Examples of the metallic substrate are metals and metal compounds of aluminum, iron, nickel, titanium, molybdenum, magnesium, manganese, copper, silver, lead, tin, chromium, beryllium, tungsten and cobalt, alloys of two or more thereof, etc.

Examples of the alloys are alloy steels such as carbon steel, Ni steel, Cr steel, Ni—Cr steel, Cr—Mo steel, stainless steel, silicon steel and permalloy; aluminum alloys such as Al—Cl, Al—Mg, Al—Si, Al—Cu—Ni—Mg and Al—Si—Cu—Ni—Mg; copper alloys such as brass, bronze, silicon bronze, silicon brass, nickel silver and nickel bronze; nickel alloys such as nickel manganese (D nickel), nickel-aluminum (Z nickel), nickel-silicon, Monel metal, Constantan, nichrome Inconel and Hastelloy; and the like.

Further as the aluminum-based metal, there can be used pure aluminum; aluminum oxide; and aluminum alloys for casting and expanding such as Al—Cu, Al—Si, Al—Mg, Al—Cu—Ni—Mg, Al—Si—Cu—Ni—Mg alloys, high tensile aluminum alloy and corrosion resistant aluminum alloy.

Also as the iron-based metals, there can be used pure iron, iron oxide, carbon steel, Ni steel, Cr steel, Ni—Cr steel, Cr—Mo steel, Ni—Cr—Mo steel, stainless steel, silicon steel, permalloy, non-magnetic steel, magnet steel, cast iron, etc.

Also the thin coating film of the present invention can be adhered to a substrate which was subjected to, for the purpose of preventing corrosion of metal, coating of other metal by electroplating, hot dipping, chromatizing, siliconizing, colorizing, sheradizing, metal spraying, etc.; forming a phosphate film by phosphatization; forming metal oxide by anodizing or heat-oxidizing; or electrochemical corrosion prevention.

Further for the purpose of enhancing adhesion, the surface of metallic substrate may be subjected to chemical preparation with a phosphoric acid, sulfuric acid, chromic acid, oxalic acid, etc., or may be subjected to surface roughening by sand blasting, shot blasting, grit blasting, honing, paper scratching, wire scratching, hair line finishing, etc. For the purpose of exhibiting clear surface pattern of the substrate, the metal surface may be subjected to coloring, printing, etching, etc.

In case of the above-mentioned aluminum or aluminum alloy substrate, in order to enhance corrosion resistance, surface hardness and adhesive property of the substrate, it is possible to form an oxide film (alumite) on the substrate by anodizing with caustic soda, oxalic acid, sulfuric acid or chromic acid and also use the aluminum or aluminum alloy substrate subjected to other surface treatments mentioned above.

Further there may be used a substrate plated, on its surface, with other metal as mentioned above, for example, steel plate subjected to hot-dip zinc-plating, hot-dip zinc alloy plating, aluminum plating, zinc-nickel plating, zinc-aluminum plating, or the like; a substrate coated with other metal by diffusion coating or thermal spraying; a substrate, on which an oxide film is formed by chemical conversion treatment with chromic acid or phosphoric acid or heat-treatment; a substrate subjected to electric corrosion preventing treatment (for example, galvanized steel plate); or the like.

Examples of the ceramic substrate are, for instance, glass, pottery, porcelain, etc. Components of glass are not particularly limited. Examples are silica glass, lead glass, alkali-free glass, alkali glass, etc.

Examples of the resin substrate are, for instance, resins having high transparency such as an acrylic resin and polycarbonate; and heat resistant resins such as heat resistant engineering plastics and thermosetting resins. Examples of the heat resistant resin are, for instance, polyamide, polyether ether ketone, polyether sulfone, polyamideimide, polysulfone, aromatic polyester, polyphenylene sulfide, and the like. Further elastomeric materials such as silicone rubber, urethane rubber and EPDM can be used.

Among the above-mentioned substrates, preferred are materials having high heat resistance not to be decomposed or deformed at a temperature for forming a coating film on a substrate and at a temperature where the coated substrate is used. Preferred are substrates having heat resistance of not less than 200° C., preferably not less than 300° C., particularly preferably not less than 380° C.

For the purpose of reflecting heat and light, a metal substrate having a high reflectance is preferred. Examples thereof are metals and alloys (for example, stainless steel plate, aluminum-plated steel plate, etc.) of aluminum, nickel, chromium, silver, etc. In addition to metals, there can be used glass, laminated materials of glass with metals having a high reflectance by vapor deposition (for example, mirrors), silicon materials (monocrystal silicon, polycrystal silicon and amorphous silicon), and the like.

For the purpose of transmitting heat and light, substrates of glass, acrylic resin, polycarbonate resin, and the like having a high transparency are selected preferably.

A laminated article comprising the above-mentioned substrate and the thin coating film of the present invention can be produced in various forms. After the substrate is processed into a desired form, the thin coating film of the present invention may be applied (post-coat), and for example, after forming the thin coating film of the present invention on a plate-like substrate, post-processing such as bending, pressing or drawing can be carried out to give a desired form (pre-coat).

The laminated article comprising the thin coating film of the present invention and a substrate having a high reflectance is one endowed with more excellent heat resistance, non-sticking property, stain-proofing property and chemical resistance while maintaining a small heat energy loss in transfer and convention of heat energies such as radiation heat and infrared ray, and energy efficiency can be maintained for a long period of time.

Accordingly the structural article of the present invention can be used for various applications as a reflecting plate, and as a heat reflecting plate because of high efficiency of transfer and convection of heat energy such as radiation heat and infrared ray.

Also the laminated article comprising the thin coating film of the present invention and a substrate having a high reflectance can impart excellent heat resistance, non-sticking property, stain-proofing property and chemical resistance without lowering an inherent reflectance of the substrate against ultraviolet rays and visible rays.

Also the laminated article comprising the thin coating film of the present invention and a substrate having a high transmissivity of light and heat can impart excellent heat resistance, non-sticking property, stain-proofing property and chemical resistance without lowering an inherent transmissivity of the substrate.

The thin coating film of the present invention or the laminated article produced by applying the thin coating film to a substrate can impart particularly effectively excellent characteristics such as heat resistance, non-sticking property and stain-proofing property of the fluorine-containing polymer in applications where transmission and reflectance of heat and light are particularly required.

Applications requiring reflectance of heat are as follows.

(1) Cooking Appliances for Heating

In case of applications to inner walls (for example, metallic substrate) and inner surfaces of door (for example, glass substrate) of cooking appliances such as electric oven, electric range with oven, electric toaster with oven, electronic range, oven for baking bread, gas oven, electromagnetic range, roaster, fish roaster, gas grill and electric grill, good effects can be exhibited on prevention of sticking of foods, oil stain and scorching and easy removal thereof, and yet since by utilizing good heat reflectance, heat loss can be minimized and heat can be transferred uniformly to foods, there is a good effect on shortening of cooking time and energy saving.

(2) Heating Appliances

In case of application to reflection plate of heating appliances such as electric heater and gas heater, good effects can be exhibited on prevention of sticking of dusts and stain and easy removal thereof, and yet good heat reflectance has effects on shortening of heating time and energy saving.

Applications requiring transmissivity of lights such as visible rays and ultraviolet rays are as follows.

(1) Optical Instruments

By applying to optical instruments, for example, display type touch panel switch, face plate of copying machine, Fresnel plate of overhead projector, display glass, optical filter for display, halogen lamp, mercury lamp, sodium lamp, electric bulb, chandelier and various lenses, heat resistance, stain-proofing property, non-sticking property and water repellency can be imparted without lowering optical characteristics, and time and labor for maintenance can be reduced greatly.

With respect to the displaying instruments, by utilizing a low refraction of the fluorine-containing polymer, there is an effective use as a reflection preventing film having stain-proofing property, water repellency and non-sticking property.

(2) Liquid Crystal Display

By applying to a liquid crystal panel, color filter substrate, polarizing plate, etc., a protection film having a high water repellency and stain-proofing property can be provided without lowering transparency and uniformity, and a failure of image attributable to foreign matter can be prevented. Further by applying to a surface of those liquid crystal displays, in addition to the above-mentioned effects, there is an effective use as a reflection preventing film by utilizing a low refraction of the fluorine-containing polymer.

By applying the thin coating film of the present invention to a small-sized precise mechanical parts, etc., which are required to be shaped and sized accurately, heat resistance, non-sticking property, mold release property and sliding property of the fluorine-containing polymer can be imparted to the precise parts without modifying a shape and size thereof. For example, applications to mechanical parts, particularly micro machine such as gear, rotor, rotation shaft, crank and turbine are preferable because heat resistance, sliding property and non-sticking property can be imparted without changing a dimensional accuracy of the parts, abrasion resistance is low and self-lubricity can be imparted without using a lubricant.

In addition to the above-mentioned effects, by using the thin coating film of the present invention, excellent characteristics of the fluorine-containing polymer can be given in various applications where it is necessary or preferable to maintain transparency and property of keeping a pattern of a substrate. Applications and parts to which the thin coating film of the present invention can be used are further raised below.

(A) Examples of cutlery: Kitchen knife, scissors, knife, cutter, chisel for sculpture, razor, hair clippers, saw, plane chisel for carpenter, auger, eyeleteer, bite, blade of drill, blade of mixer, blade of juicer, blade of powder mill, blade of lawn mower, punch, straw cutter, stapler, blade of can opener, surgical knife, and the like.

(B) Examples of needles: Needle for acupuncture, sewing needle, sewing machine needle, needle for tatami-mat, index, surgical needle, safety pin, and the like.

(C) Examples of ceramic products: China and porcelain, glass, ceramic or enamel products. For example, sanitary ceramic products (for example, toilet bowl, wash-bowl, bath tub, and the like), table wares (for example, rice bowl, dish, porcelain bowl, mug, cup, bottle, coffee maker, pot, earthenware mortar, and the like), vase (flower bowl, flowerpot, bud vase, and the like), water tank (water tank for culture, water tank for appreciation, and the like), instruments for chemical experiment (beaker, reactor, test tube, flask, petit dish, cooling tube, stirring rod, stirrer, mortar, but, injector), roof tile, tile, enamel ware, enamel wash-basin and enamel pot)

(D) Examples of mirrors: Hand mirror, full-length mirror, mirror for bath, mirror for lavatory, mirror for car (rear view mirror, fender mirror), half-length mirror, mirror for show window, large looking glass in department store, and the like.

(E) Examples of parts for molding: Die for press molding, die for cast molding, die for injection molding, die for transfer molding, die for vacuum molding, die for blow molding, die for photo-setting resin, die for extrusion molding, spinneret for inflation molding, spinneret for fiber spinning, calender roll, and the like.

(F) Examples of decorations: Watch, jewel, pearl, sapphire, ruby, emerald, garnet, cat's-eye, diamond, toppers, bloodstone, aquamarine, sardonyx, turquoise, agate, marble, amethyst, cameo, opal, crystal, glass, ring, bracelet, brooch, tiepin, ear ring, necklace, precious metal goods, frame of glasses made of platinum, gold, silver, copper, aluminum, titanium, tin, alloys thereof or stainless steel, and the like.

(G) Examples of food molds: Mold for baking cake, mold for baking cookie, mold for baking bread, mold for chocolate, mold for jelly, mold for ice cream, pan for oven, pan for ice making, and the like.

(H) Examples of cooking appliances: Pot, kettle, frying pan, griddle, grill, oil drain, griddle for tako-yaki, and the like.

(I) Examples of domestic appliances: TV set, radio set, tape recorder, audio player, CD, refrigerator, freezer, air conditioner, juicer, mixer, fan of electric fan, illumination apparatuses, dial plate, dryer for waving of hair, ventilation fan, iron, washing tub of electric washing machine, and the like.

(J) Examples of sports goods: Skis, fishing rod, pole for high jump, boat, yacht, jet ski, surf board, golf ball, bowl for bowling, fishing line, fishing net, fishing float, and the like.

(K) Examples of applications to vehicles:
(1) FRP (fiber-reinforced resin): Bumper, engine cover
(2) Phenol resin: Brake
(3) Polyacetal: Wiper gear, gas valve, parts for carburetor
(4) Polyamide: Radiator fan
(5) Polyarylate: Direction indicating lens, lens for instrument panel, relay housing
(6) Polybutylene terephthalate: Rear fender, front fender
(7) Polyaminobismaleimide: Parts for engine, gear box, wheel, suspension drive system
(8) Polyphenylene oxide: Radiator grille, wheel cap
(9) Saturated polyester resin: Car body, fuel tank, heater housing, instrument panel
(10) Others: Window glass, head light cover, aluminum wheel for car, parts around engine, for example, piston, injector nozzle, and the like.

(L) Examples of office supplies: Fountain pen, ball-point pen, automatic pencil, pencil case, binder, desk, chair, bookshelf, rack, telephone stand, scale, drawing instruments, and the like.

(M) Examples of building materials: Roofing materials, exterior wall materials, interior materials. Roofing materials such as ceramic tile, slate tile and galvanized iron plate; outside wall materials such as woods (including processed woods), mortar, concrete, ceramic siding, metal siding, brick, stone material, plastic material and metallic material such as aluminum; interior materials such as woods (including processed wood), metallic material such as aluminum, plastic material, paper and fiber.

(N) Examples of stone materials: Granite, marble, and the like. For example, building, building material, art, ornament, bath, grave, memorial monument, gate post, stone fence, paving stone, and the like.

(O) Examples of housing facilities: Toilet, washstand, wall, door and wash basin of systemized kitchen, range hood, door, bath tub, tap metal, and the like.

(P) Examples of parts for office automation apparatuses: Roll (fixing, pressing), belt (fixing), contact glass, parts (nozzle, etc.) of ink jet printer, separation clamp, paper delivery roll, and the like.

(Q) Electric and electronic parts: Materials and parts for protecting and moisture-preventing printed circuit board, materials and parts for moisture-preventing insulation of lead wire and terminal of electric devices, materials and parts for insulation, protection and moisture prevention of electric and electronic parts, electret, metal plate for mold-releasing of printed circuit board, and the like.

(R) Others: Thermos bottle, vacuum equipment, high voltage resistant insulator having a high water- and oil-repellency and stain-proofing property such as insulator for power transmission, spark plugs, and the like.

PREPARATION EXAMPLE 1

Preparation of Aqueous Dispersion Comprising PFA Having Hydroxyl

A 3-liter stainless steel autoclave equipped with a stirrer, valve, pressure gauge and thermometer was charged with 1,500 ml of pure water and 13.5 g of ammonium perfluorooctanoate. After replacing with nitrogen gas sufficiently, the autoclave was evacuated and charged with 20 ml of ethane gas.

Then 1.8 g of perfluoro-(1,1,9,9-tetrahydro-2,5-bistrifluoromethyl-3,6-dioxa-8-nonenol) (formula (7)):

(7)

and 16.5 g of perfluoro(propyl vinyl ether) (PPVE) were fed into the autoclave with pressurized nitrogen gas, and a temperature inside the system was maintained at 70° C.

Pressurized tetrafluoroethylene (TFE) gas was introduced into the autoclave with stirring so that the inside pressure of the autoclave became 8.5 kgf/cm$^2$G.

Then a solution prepared by dissolving 0.15 g of ammonium persulfate in 5.0 g of water was added with pressurized nitrogen gas to initiate the reaction. Since the pressure lowered with the advance of the polymerization reaction, it was increased again to 8.5 kgf/cm$^2$G by feeding tetrafluoroethylene gas at the time when it lowered to 7.5 kgf/cm$^2$G. Thus the decreasing and increasing of the pressure were repeated.

With continuing supply of tetrafluoroethylene, every time when about 40 g of tetrafluoroethylene gas was consumed after starting of the polymerization, 1.9 g of the above-mentioned fluorine-containing ethylenic monomer having hydroxyl (compound represented by the formula (7)) was introduced under pressure nine times (17.1 g in total) to continue the polymerization. At the time when about 400 g of tetrafluoroethylene gas was consumed after starting of the polymerization, the supplying thereof was terminated and the autoclave was cooled and the un-reacted monomer was released to give 1,950 g of a bluish semi-transparent aqueous dispersion.

A concentration of the polymer in the obtained aqueous dispersion was 21.7%, and a particle size measured by dynamic light scattering method was 74 nm. Also a part of the obtained aqueous dispersion was sampled and subjected to freeze coagulation, and the precipitated polymer was rinsed and dried to isolate a white solid. Components and their amounts of the obtained copolymer which were determined through $^{19}$F-NMR and IR analyses were TFE/PPVE/ (Fluorine-containing ethylenic monomer having hydroxyl and represented by the formula (7))=98.0/1.0/1.0% by mole.

In infrared spectrum, characteristic absorption of —OH was observed at 3,620 to 3,400 cm$^{-1}$. According to DSC analysis, Tm was 318° C., and according to DTGA analysis, 1% thermal decomposition temperature Td was 379° C.

PREPARATION EXAMPLE 2

Preparation of Aqueous Dispersion Comprising PTFE Having Carboxyl

The same autoclave as in Preparation Example 1 was charged with 1,500 ml of pure water and 9.0 g of ammonium perfluorooctanoate. After replacing with nitrogen gas sufficiently, the autoclave was evacuated and charged with 20 ml of ethane gas.

Then 1.8 g of perfluoro-(9,9-dihydro-2,5-bistrifluoromethyl-3,6-dioxa-8-nonenoic acid) (formula (8):

was fed into the autoclave with pressurized nitrogen gas, and a temperature inside the system was maintained at 70° C. Pressurized tetrafluoroethylene (TFE) gas was introduced into the autoclave with stirring so that the inside pressure of the autoclave became 8.5 kgf/cm$^2$G.

Then a solution prepared by dissolving 0.15 g of ammonium persulfate in 5.0 g of water was added with pressurized nitrogen gas to initiate the reaction. Since the pressure lowered with the advance of the polymerization reaction, it was increased again to 8.5 kgf/cm$^2$G by feeding tetrafluoroethylene gas at the time when it lowered to 7.5 kgf/cm$^2$G. Thus the decreasing and increasing of the pressure were repeated.

With continuing supply of tetrafluoroethylene, every time when 40 g of tetrafluoroethylene gas was consumed after starting of the polymerization, 1.8 g of the above-mentioned fluorine-containing ethylenic monomer having carboxyl (compound represented by the formula (8)) was introduced under pressure three times (5.4 g in total) to continue the polymerization. At the time when 160 g of tetrafluoroethylene gas was consumed after starting of the polymerization, the supplying thereof was terminated and the autoclave was cooled and the un-reacted monomer was released to give 1,670 g of an aqueous dispersion. A concentration of the polymer in the obtained aqueous dispersion was 10.0%, and a particle size thereof was 79.0 nm.

Also a part of the obtained aqueous dispersion was sampled and a white solid was isolated in the same manner as in Preparation Example 1. The obtained white solid was analyzed in the same manner.

TFE/(Fluorine-containing monomer having carboxyl and represented by the formula (8))=98.8/1.2% by mole.
Tm=310° C.
1% Thermal decomposition temperature Td=313° C.

In infrared spectrum, characteristic absorption of —OH was observed at 3,680 to 2,800 cm$^{-1}$ and characteristic absorption of C=O was observed at 1,790 cm$^{-1}$.

PREPARATION EXAMPLE 3

Synthesis of Aqueous Dispersion of PFA Having no Functional Group

Emulsion polymerization was carried out in the same manner as in Preparation Example 1 except that perfluoro-(1,1,9,9-tetrahydro-2,5-bistrifluoromethyl-3,6-dioxa-8-nonenol) (compound of the formula (7)) was not used, and 1,920 g of an aqueous dispersion of PFA having no functional group was obtained.

A concentration of the polymer in the aqueous dispersion was 21.6%, and a particle size thereof was 156 nm. A white solid was isolated and analyzed in the same manner as in Preparation Example 1.

TFE/PPVE=99.3/0.7% by mole
Tm=317° C. 1% Thermal decomposition temperature Td=479° C.

In infrared spectrum, no characteristic absorption of —OH was observed.

PREPARATION EXAMPLE 4

Preparation of Aqueous Dispersion for Coating

To the aqueous dispersion of PFA having hydroxyl of Preparation Example 1 was added a nonionic surfactant NONION HS-208 (available from NOF CORPORATION) so as to be 9.0% by weight based on the weight of PFA polymer having hydroxyl, followed by stirring uniformly. The solution was concentrated to 40% in a concentration of polymer.

PREPARATION EXAMPLE 5

Synthesis of PFA Having Hydroxyl

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then 5.0 g of perfluoro-(1,1,9,9-tetrahydro-2,5-bistrifluoromethyl-3,6-dioxa-8-nonenol) (compound of the formula (7)), 130 g of perfluoro(propyl vinyl ether) (PPVE) and 180 g of methanol were fed into the autoclave with pressurized nitrogen gas, and a temperature inside the system was maintained at 35° C.

Pressurized tetrafluoroethylene (TFE) gas was introduced into the autoclave with stirring so that the inside pressure became 8.0 kgf/cm$^2$G. Then 0.5 g of a 50% methanol solution of di-n-propyl peroxydicarbonate was fed with pressurized nitrogen to initiate the reaction. Since the pressure lowered with the advance of the polymerization reaction, at the time when the pressure lowered down to 7.5 kgf/cm$^2$G, it was increased again to 8.0 kgf/cm $^2$G by feeding tetrafluoroethylene gas, and the decreasing and increasing of the pressure were repeated.

With continuing supply of tetrafluoroethylene, every time when about 60 g of tetrafluoroethylene gas was consumed after starting of the polymerization, 2.5 g of the fluorine-containing ethylenic monomer having hydroxyl (compound represented by the formula (7)) was introduced nine times (22.5 g in total) under pressure to continue the polymerization. When about 600 g of tetrafluoroethylene was consumed after starting of the polymerization, the supplying thereof was terminated. The autoclave was cooled and the un-reacted monomer and R-114 were released.

The obtained polymer was washed with water, rinsed with methanol and then vacuum-dried to give 710 g of a white solid. The composition of the obtained polymer was TFE/PPVE/(Fluorine-containing ethylenic monomer having hydroxyl and represented by the formula (7))=97.0/2.0/1.0% by mole according to $^{19}$F-NMR and IR analyses. In infrared spectrum, characteristic absorption of —OH was observed at 3,620 to 3,400 cm$^{-1}$. According to DSC analysis, Tm was 305° C., and according to DTGA analysis, 1% thermal decomposition temperature Td was 375° C. A melt flow rate measured under conditions of preheating at 372° C. for five minutes at a load of 7 kgf/cm$^2$ by using Koka-type flow tester and nozzles of 2 mm diameter×8 mm length was 32 g/10 min.

PREPARATION EXAMPLE 6

Preparation of PFA Powder Coating Composition Having Hydroxyl

The PFA powder having hydroxyl (apparent specific gravity: 0.5, true specific gravity: 2.1, average particle size: 600 μm) and prepared in Preparation Example 5 was compressed into a sheet of 60 mm wide×5 mm thick by a Roller Compactor (Model BCS-25 available from Shinto Kogyo Kabushiki Kaisha), and then crushed into about 10 mm diameter by a crusher and further finely pulverized at room temperature at 11,000 rpm by a pulverizer (Cosmomizer Model N-1 available from Kabushiki Kaisha Nara Kikai Seisakusho). Subsequently the coarse powder particles of not less than 170 mesh (88 μm of sieve opening) were separated by a classifier (Hibolder Model 300SD available from Shi-Tokyo Kikai Kabushiki Kaisha) to give a PFA powder coating composition having hydroxyl. An apparent density of the powder was 0.7 g/ml, and an average particle size thereof was 20 μm.

PREPARATION EXAMPLE 7

Production of Film of PFA Having Hydroxyl by Extrusion

The white solid obtained in Preparation Example 5 was extruded at 350° to 370° C. by using a two screw extruder (LABOPLASTOMIL available from Toyo Seiki Kabushiki Kaisha) to give pellets. The pellets were extruded at 360 °to 380° C. at a roller temperature of 120° C. by using a single screw extruder (LABOPLASTOMIL available from Toyo Seiki Kabushiki Kaisha) to give a film of 10 cm wide×50 μm thick.

PREPARATION EXAMPLE 8

A 1-liter stainless steel autoclave equipped with a stirrer, valve, pressure gauge and thermometer was charged with 250 g of butyl acetate, 36.4 g of vinyl pivalate (VPi) and as a non-fluorine-containing monomer having hydroxyl, 32.5 g of 4-hydroxybutyl vinyl ether (HBVE) and 4.0 g of isopropoxycarbonyl peroxide. After cooling to 0° C. with ice and replacing with nitrogen gas sufficiently, the autoclave was evacuated and charged with 47.5 g of isobutylene (IB) and 142 g of tetrafluoroethylene (TFE).

The autoclave was heated to 40° C. and reaction was carried out for 30 hours with stirring. At the time when the inside pressure of the reaction vessel was lowered to not more than 2.0 kg/cm$^2$, the reaction was terminated. The autoclave was cooled and un-reacted gas monomer was released, and thus a butyl acetate solution of a fluorine-containing polymer was obtained. A polymer concentration was 45%.

A fluorine-containing polymer was separated from the obtained butyl acetate solution of a fluorine-containing polymer through re-precipitation method, followed by sufficiently reducing pressure and drying, thus being separated in the form of white solid. According to $^1$H-NMR, $^{19}$F-NMR and elementary analyses, the obtained fluorine-containing polymer was a copolymer of TFE/IB/VPi/HBVE=44/34/15/7% by mole. According to a DTGA analysis, 1% thermal decomposition temperature Td was 220° C., and in a DSC analysis, there was no crystalline melting point.

EXAMPLE 1

(1) Pre-treatment of Substrate

A pure aluminum plate (A1050P) of 150×35×0.5 (mm) (0.5 mm thick) was degreased with acetone. (2) Coating (dipping method)

The above-mentioned aluminum plate was dipped in the aqueous dispersion of hydroxyl-containing PFA prepared in Preparation Example 1 and pulled up at a speed of 30 mm/min to form a wet coating film.

(3) Baking

The wet coating film obtained in (2) above was air-dried at room temperature and baked at 380° C. for 15 minutes to give a laminated article comprising the aluminum plate and a thin coating film of fluorine-containing polymer provided thereon.

(4) Evaluation

① Measurement of Thickness of Thin Coating Film of Fluorine-containing Polymer

A thickness of the thin coating film of fluorine-containing polymer was measured with an atomic force microscope AFM (Model SPI3800 available from Seiko Denshi Kabushiki Kaisha).

② Measurement of Infrared Ray Transmittance of a Layer of Fluorine-containing Polymer A part of the laminated article obtained in (3) above was cut and the cut portion was dipped in 5% diluted hydrochloric acid to completely melt the aluminum plate and separate the coating film (layer of fluorine-containing polymer). An average transmittance of the resulting coating film was measured in a range of 400 to 4,000 $cm^{-1}$ with a FT-IR equipment.

③ Water Contact Angle

A water contact angle on a surface of the laminated article obtained in (3) above was measured at room temperature by using a contact angle meter.

④ Abrasion Resistance Test

A water contact angle was measured after the surface of the above-mentioned laminated article was rubbed by 1,000 turns at a load of 250 $g/cm^2$ with a cotton cloth (BEMCOT (trade name) M-3 available from ASAHI CHEMICAL CO., LTD.) by using a rubbing tester (available from TAIHEI RIKA KOGYO KABUSHIKI KAISHA).

⑤ Heat Resistance Test

The above-mentioned laminated article was put in a hot air dryer set at 300° C., taken out 100 hours after and cooled to room temperature. Then a water contact angle was measured.

⑥ Hot Water Resistance Test

After the above-mentioned laminated article was put in hot water of 98° C. for 100 hours, a change in appearance thereof was observed. When there is no change in appearance, further a water contact angle was measured.

The results of measurements of ① to ⑥ are shown in Table 1.

EXAMPLE 2

A laminated article comprising an aluminum plate and a coating film of PFA having hydroxyl was produced in the same manner as in Example 1 except that the dip coating was carried out by increasing the pulling up speed from 30 mm/min to 100 mm/min. Evaluation was carried out and results thereof are shown in Table 1.

Comparative Example 1

(1) Pre-treatment of Substrate

Pre-treatment was carried out in the same manner as in Example 1.

(2) Coating

The aqueous dispersion of hydroxyl-containing PFA for coating prepared in Preparation Example 4 was applied to the aluminum plate by a 10 mil applicator to give a wet coating film.

(3) Baking

The wet coating film obtained in (2) above was air-dried and then subjected to baking at 400° C. for 5 minutes to give a laminated article.

(4) Evaluation

The evaluation was carried out in the same manner as in Example 1 except that a coating thickness was measured with an eddy-current instrument for measuring thickness. The results are shown in Table 1.

Comparative Example 2

Production and evaluation of a laminated article were carried out in the same manner as in Example 1 except that the aqueous dispersion of PFA having no functional group and prepared in Preparation Example 3 was used instead of the aqueous dispersion of hydroxyl-containing PFA prepared in Preparation Example 1. The results are shown in Table 1.

Comparative Example 3

(1) Pre-treatment of Substrate

Pre-treatment was carried out in the same manner as in Example 1.

(2) Coating (Electrostatic Coating of Powder)

The powder coating composition of PFA having hydroxyl which was prepared in Preparation Example 6 was subjected to electrostatic coating at room temperature at an applied voltage of 40 kV by using an electrostatic powder coating machine (Model GX3300 available from Iwata Toso Kabushiki Kaisha).

(3) Baking

The coated plate was subjected to baking at 330° C. for 15 minutes to give a laminated article.

(4) Evaluation

The evaluation was carried out in the same manner as in Example 3.

Comparative Example 4

(1) Pre-treatment of Substrate

Pre-treatment was carried out in the same manner as in Example 1.

(2) Coating

The fluorine-containing polymer (45% butyl acetate solution) obtained in Preparation Example 8 was diluted with butyl acetate to a polymer concentration of 20%. The 20% solution was coated on an aluminum plate with a 10 mil applicator.

(3) Baking

The coated plate obtained in (2) above was subjected to baking at 120° C. for 15 minutes to give a laminated article.

(4) Evaluation

The evaluation was carried out in the same manner as in Comparative Example 1.

Comparative Example 5

Only infrared ray transmittance of 50 µm thick film of PFA having hydroxyl and obtained in Preparation Example 7 was measured in the same manner as in Example 1. The results are shown in Table 1.

TABLE 1

| | Example 1 | Example 2 | Com. Ex. 1 | Com. Ex. 2 | Com. Ex. 3 | Com. Ex. 4 | Com. Ex. 5 |
|---|---|---|---|---|---|---|---|
| Substrate | Pure aluminum | Pure aluminum | Pure aluminum | Pure aluminum | Pure aluminum | Pure aluminum | — |
| Fluorine-containing polymer layer | PFA having OH | PFA having OH | PFA having OH | PFA | PFA having OH | Polymer of Prep. Ex. 8 | PFA film having OH |
| Coating method | Dip coating (10 mm/min) | Dip coating (100 mm/min) | Applicator | Dip coating (10 mm/min) | Electrostatic powder coating | Applicator | — |
| Appearance of fluorine-containing polymer layer | Transparent | Transparent | Transparent | Semi-transparent | Transparent | Transparent | Transparent |
| Thickness of fluorine-containing polymer layer ($\mu$m) | 0.082 | 0.17 | 3.0 | 0.40 | 12 | 2.0 | 50 |
| Infrared ray transmittance of fluorine-containing polymer layer (%) | 98 or more | 98 or more | 92.8 | 97.0 | 80.5 | — | 51.1 |
| Water contact angle (degree) | 112 | 110 | 115 | 115 | 110 | 90 | — |
| Water contact angle after abrasion resistance test (degree) | 105 | 108 | 115 | 40 (100 turns) | 110 | 90 | — |
| Water contact angle after heat resistance test (degree) | 120 | 120 | 120 | 116 | 115 | Yellowing, foaming | — |
| Water contact angle after hot water resistance test (degree) | 104 | 109 | 116 | Peeling | 107 | Peeling | — |

EXAMPLES 3 to 6

(1) Pre-treatment of Substrate

A SUS430 plate subjected to bright annealing was degreased with toluene, washed with acetone and washed with water, followed by dipping in an alkaline mixture bath (85° C.) comprising 60 g/liter of NaCO$_3$ and 20 g/liter of NaOH for degreasing for 20 minutes and then washing with pure water and drying.

(2) Coating, (3) Baking

Dip coating and baking were carried out in the same manner as in Example 1 by using the above-mentioned substrate at a pulling up speed of 10 mm/min in Example 3, 50 mm/min in Example 4 and 100 mm/min in Example 5. In Example 6, coating and baking were carried out in the same manner as in Comparative Example 1. Thus laminated articles were obtained.

(4) Evaluation

① Measurement of Thickness of Coating Film

Measurements were made in the same manner as in Example 1 in cases of Examples 3, 4 and 5, and in the same manner as in Comparative Example 1 in case of Example 6. With respect to ② water contact angle, ③ abrasion resistance test, ④ heat resistance test and ⑤ hot water resistance test, the same procedures as in Example 1 were carried out.

⑥ Measurement of Infrared Ray Reflectance (i) A regular reflection device was mounted on Model 1760X FT-IR equipment (available from Perkin Elmer Co., Ltd.), and a reflectance was measured in the air at an incidence angle of 45° against the test plate. An integral average reflectance in a range of 4,000 to 400 cm$^{-1}$ was measured in a relative reflectance based on an aluminum vapor deposition plate.

(ii) A regular reflection device was mounted on Model IFS-120HR FT-IR equipment (available from Bruker), and a reflectance was measured in vacuum at an incidence angle of 11°. An integral average reflectance in a range of 4,000 to 400 cm$^{-1}$ was measured in a relative reflectance based on a gold vapor deposition plate.

The results are shown in Table 2.

⑦ Visible Light Reflectance

A reflectance at 550 nm was measured with a spectrophotometer U-3410 available from Hitachi, Ltd. The results are shown by a relative value provided that a reflectance of the substrate is 100%.

The results are shown in Table 2.

Comparative Example 6

A laminated article was produced in the same manner as in Comparative Example 2 except that the substrate was changed to a SUS plate of Example 3, and the obtained laminated article was evaluated in the same manner as in Example 3. The results are shown in Table 2.

Comparative Example 7

A laminated article was produced in the same manner as in Comparative Example 3 except that the substrate was changed to a SUS plate of Example 3, and the obtained laminated article was evaluated in the same manner as in Example 6. The results are shown in Table 2.

Comparative Example 8

An infrared ray reflectance of a SUS plate pre-treated in the same manner as in Example 3 was measured in the same manner as in Example 3. The results are shown in Table 2.

EXAMPLE 7

Pre-treating (1) of SUS430BA plate, coating (2), baking (3) and evaluation (4) were carried out in the same manner as in Example 3 except that the aqueous dispersion of PTFE having carboxyl obtained in Preparation Example 2 was used instead of the aqueous dispersion of PFA having hydroxyl obtained in Preparation Example 1. The results are shown in Table 2.

TABLE 2

| | Example 3 | Example 4 | Exmple 5 | Example 6 | Example 7 | Com. Ex. 6 | Com. Ex. 7 | Com. Ex. 8 |
|---|---|---|---|---|---|---|---|---|
| Substrate | SUS430BA | SUS430BA | SUS430BA | SUS430BA | SUS430 | SUS430BA | SUS430BA | SUS430BA |
| Fluorine-containing polymer layer | PFA having OH | PFA having OH | PFA having OH | PFA having OH | PTFE having COOH | PFA | PFA having OH | — |
| Coating method | Dip coating (10 mm/min) | Dip coating (50 mm/min) | Dip coating (100 mm/min) | Applicator | Dip coating (10 mm/min) | Dip coating (10 mm/min) | Electrostatic powder coating | — |
| Appearance of fluorine-containing polymer layer | Transparent | Transparent | Transparent | Transparent | Transparent | Semi-transparent | Transparent | — |
| Thickness of fluorine-containing polymer layer ($\mu$m) | 0.08 | 0.15 | 0.18 | 1.2 | 0.1 | 0.3 | 11 | — |
| Water contact angle (degree) | 110 | 115 | 112 | 115 | 117 | 115 | 112 | — |
| Water contact angle after abrasion resistance test (degree) | 104 | 106 | 108 | 110 | 107 | 40 (100 turns) | 112 | — |
| Water contact angle after heat resistance test (degree) | 120 | 120 | 120 | 120 | 108 | 118 | 117 | — |
| Water contact angle after hot water resistance test (degree) | 104 | 106 | 106 | 110 | 102 | Peeling | 115 | — |
| Infrared ray reflectance (%) | | | | | | | | |
| (i) Regular reflectance at 45 degrees | 88 | 87 | 87 | 75 | 88 | 80 | 37 | 88 |
| (ii) Regular reflectance at 11 degrees | 85 | 86 | 86 | — | 84 | — | — | 85 |
| Visible light reflectance (%) | 111.5 | 113.4 | 99.9 | 92.4 | 105 | 74.9 | 21 | 100 |

PREPARATION EXAMPLE 9
Synthesis of Aqueous Dispersion for Coating

To 500 g of the aqueous dispersion of hydroxyl-containing PFA prepared in Preparation Example 1 was added 10 g of a nonionic surfactant NONION HS-208 (same one as in Preparation Example 4), followed by stirring uniformly. A concentration of the polymer was 20%.

EXAMPLE 8

(1) Pre-treatment of Substrate

An alkali-free glass plate of 100×50×1.5 (mm) was cleaned with a neutral detergent and then dried.

(2) Coating (Spray Method)

The coating composition comprising PFA having hydroxyl and prepared in Preparation Example 9 was applied on the plate by air spraying so that a coating thickness would become 1 $\mu$m.

(3) Baking

The wet coating film obtained in (2) above was subjected to infrared drying at 90° C. for 10 minutes and then baking at 350° C. for 15 minutes to give a laminated article.

(4) Evaluation

① Water Contact Angle

The same procedures as in Example 1 were carried out.

② Adhesion Test

A cross-cut test was carried out according to JIS K 5400 and evaluation was carried out with respect to how many cross-cut squares of coating film remain un-peeled by peeling with an adhesive tape.

② Abrasion Resistance Test

The same procedures as in Example 1 were carried out.

④ Heat Resistance Test

The laminated article was put in a hot air dryer set at 300° C., and after taken out 100 hours after, the article was cooled at room temperature. Then a water contact angle was measured and the same adhesion test as in ② above was carried out.

⑤ Hot Water Resistance Test

After the laminated article was dipped in 98° C. hot water for 100 hours, a water contact angle was measured and the same adhesion test as in ② above was carried out.

⑥ Visible Light Transmission

A light transmission at 550 nm of the above-mentioned laminated article was measured by using a photospectrometer (same one as in Example 3). The results are shown in Table 3.

EXAMPLE 9

(1) Pre-treatment of substrate, (2) coating, (3) baking and (4) evaluation were carried out in the same manner as in Example 8 except that a silica glass was used instead of alkali-free glass.

EXAMPLE 10

Coating and baking were carried out in the same manner as in Example 8 by using a polyimide film of 150×70×0.1 (mm) (KAPTON film available from E.I. Du Pont de Nemours & Co. Inc.) to give a laminated article. Measurement of water contact angle, adhesion test, heat resistance test and hot water resistance test were carried out in the same manner as in Example 8. The results are shown in Table 3.

COMPARATIVE EXAMPLES 9 to 10

Production of laminated articles and evaluation thereof were carried out in the same manner as in Example 9 in case of Comparative Example 9 and Example 10 in case of Comparative Example 10 except that an aqueous dispersion of PFA having no functional group (NEOFLON PFA DISPERSION AD-2CR available from DAIKIN INDUSTRIES, LTD.) was used instead of the coating composition prepared from the aqueous dispersion of hydroxyl-containing PFA prepared in Preparation Example 9. The results are shown in Table 3.

PREPARATION EXAMPLE 10
Preparation of Coating Composition Comprising PFA Having OH Group and PES 150 Gram of aqueous dispersion for coating of hydroxyl-containing PFA prepared in Preparation Example 9 and 80 g of 25% aqueous dispersion prepared by dispersing polyether sulphone (available from Sumitomo Chemical Company, Limited) to water were mixed, stirred uniformly and dispersed. (Hydroxyl-containing PFA:PES=60:40% by weight)

PREPARATION EXAMPLE 11
Preparation of Aqueous Dispersion for Coating Comprising PFA Having No Functional Group An aqueous dispersion for coating was prepared in the same manner as in Preparation Example 9 except that the aqueous dispersion of PFA having no functional group prepared in Preparation Example 3 as used instead of the aqueous dispersion of PFA having hydroxyl prepared in Preparation Example 1. A concentration of the polymer as 19.8% by weight.

PREPARATION EXAMPLE 12
Preparation of Coating Composition Comprising PFA Having No Functional Group and PES A coating composition comprising PFA and PES (PFA:PES=60:40% by weight) was prepared in the same manner as in Preparation Example 10 except that the aqueous dispersion for coating of PFA having no functional group prepared in Preparation Example 11 was used instead of the aqueous dispersion of PFA having hydroxyl prepared in Preparation Example 9.

EXAMPLE 11
(1) Pre-treatment of Substrate

A SUS430 plate of 150×70×0.5 (mm) subjected to bright annealing (BA) was degreased with acetone.
(2) Coating
(i) Under Coating The coating composition comprising PFA having OH group and PES which was prepared in Preparation Example 10 was applied on the plate by air spraying so that a coating thickness would become 1 μm, followed by infrared drying at 90° C. for 10 minutes.
(ii) Top Coating A PTFE dispersion (POLYFLON PTFE DISPERSION D-1 available from DAIKIN INDUSTRIES, LTD.) diluted with water to 20% by weight was applied to the above-mentioned dried coating film by air spraying so that a coating thickness would become 1 μm (2 μm in total).
(3) Baking The coating film obtained in (2) above was subjected to infrared drying at 90° C. for 10 minutes and then baking at 380° C. for 15 minutes to give a laminated article.
(4) Evaluation
① Water Contact Angle
② Abrasion Resistance Test With respect to ① and ②, the same procedures as in Example 1 were carried out.
③ Heat Resistance Test A water contact angle after heating at 300° C. for 100 hours was measured in the same manner as in Example 1, and the laminated article after heating was subjected to the same abrasion test as in ② above.
④ Non-sticking Property Test at High Temperature A mixture of soy sauce/sugar=50/50% by weight was dropped on a surface of coating film in the form of circle having a diameter of about 1 cm, and then heated at 300° C. for 20 minutes in a hot air dryer. After cooling, carbonized mixture was wiped off with a wet cotton cloth made damp with water and an appearance of the coating film after the wiping off was observed with naked eyes. A degree of remaining scorching mark and a failure of coating film were evaluated.
⑤ Infrared Ray Reflectance A regular reflectance at 45° was measured in the same manner as in Example 3. The respective results are shown in Table 3.

EXAMPLE 12

A laminated article was produced (pre-treatment, coating, baking) and evaluated in the same manner as in Example 11 except that a SUS430BA plate subjected to treatment with a chromic acid was used as a substrate and the aqueous dispersion for coating comprising PFA having hydroxyl and prepared in Preparation Example 9 was used as a coating composition for under coating. The results are shown in Table 4.

EXAMPLE 13

A laminated article was produced (pre-treatment, coating, baking) and evaluated in the same manner as in Example 12 except that the PFA dispersion (NEOFLON PFA DISPERSION AD-2CR available from DAIKIN INDUSTRIES, LTD.) diluted with water to 20% was used as a coating composition for top coating. The results are shown in Table 4.

Comparative Example 11

A laminated article was produced (pre-treatment, coating, baking) and evaluated in the same manner as in Example 11 except that the coating composition comprising PFA and PES and prepared in Preparation Example 12 was used as a coating composition for under coating instead of the coating composition comprising PFA having OH group and PES and prepared in Preparation Example 10. The results are shown in Table 4.

Comparative Example 12

A laminated article was produced (pre-treatment, coating, baking) and evaluated in the same manner as in Example 12 except that the aqueous dispersion for coating comprising PFA having no functional group and prepared in Preparation Example 11 was used as a coating composition for under coating instead of the aqueous dispersion for coating comprising PFA having hydroxyl and prepared in Preparation Example 9. The results are shown in Table 4.

Comparative Example 13

A laminated article was produced (pre-treatment, coating, baking) and evaluated in the same manner as in Example 13 except that the under coating was carried out by air spraying to form a coating film having a thickness of 2 μm and further top coating was carried out by air spraying to form a coating film having a thickness of 2 μm, thus forming a coating film having a total thickness of 4 μm. The results are shown in Table 4.

Comparative Example 14

A laminated article was produced (pre-treatment, coating, baking) and evaluated in the same manner as in Comparative Example 13 except that the coating was carried out by air spraying in the coating step (2) to form a coating film having a thickness of 4 μm by using only the coating composition comprising PFA and PES and prepared in Preparation Example 12. The results are shown in Table 4.

TABLE 3

|  | Example 8 | Example 9 | Example 10 | Com. Ex. 9 | Com. Ex. 10 |
|---|---|---|---|---|---|
| Substrate | Alkali-free glass | Silica glass | Polyimide film | Silica glass | Polyimide film |
| Fluorine-containing polymer layer | PFA having OH | PFA having OH | PFA having OH | PFA | PFA |
| Coating method | Spray coating | Spray coating | Spray coating | Spray coating | Spray coating |
| Appearance of fluorine-containing polymer layer | Transparent | Transparent | Transparent | Transparent | Transparent |
| Thickness of fluorine-containing polymer layer ($\mu$m) | 1.0 | 1.0 | 1.0 | 1.0 | 1.0 |
| Water contact angle (degree) | 115 | 118 | 113 | 118 | 115 |
| Adhesion | 100/100 | 100/100 | 100/100 | 0/100 | 0/100 |
| Water contact angle after abrasion resistance test (degree) | 106 | 109 | 110 | 50 or less (peeling) | 50 or less (peeling) |
| Water contact angle after heat resistance test (degree) | 117 | 120 | 118 | Spontaneous peeling | Spontaneous peeling |
| Adhesion | 100/100 | 100/100 | 100/100 | — | — |
| Water contact angle after hot water resistance test (degree) | 114 | 116 | 119 | Spontaneous peeling | Spontaneous peeling |
| Adhesion | 100/100 | 100/100 | 100/100 | — | — |
| Visible light transmission (550 nm) (%) | 95 | 96 | — | 93 | — |

TABLE 4

|  | Example 11 | Example 12 | Example 13 | Com. Ex. 11 | Com. Ex. 12 | Com. Ex. 13 | Com. Ex. 14 |
|---|---|---|---|---|---|---|---|
| Substrate | SUS430BA | SUS430BA | SUS430BA | SUS430BA | SUS430BA | SUS430BA | SUS430BA |
| Pre-treatment of substrate | — | Treatment with chromic acid | Treatment with chromic acid | — | Treatment with chromic acid | Treatment with chromic acid | Treatment with chromic acid |
| Kind of under coating | PFA having OH + PES | PFA having OH | PFA having OH | PFA + PES | PFA | PFA having OH | PFA + PES |
| Kind of top coating | PTFE | PTFE | PFA | PTFE | PTFE | PFA | — |
| Coating method | Spray coating 2 coats/1 bake | Spray coating 2 coats/1 bake | Spray coating 2 coats/1 bake | Spray coating 2 coats/1 bake | Spray coating 2 coats/1 bake | Spray coating 2 coats/1 bake | Spray coating 1 coat/1 bake |
| Appearance of coating film | Semi-transparent | Semi-transparent | Transparent | Semi-transparent | Semi-transparent | Transparent | Transparent |
| Thickness of coating film ($\mu$m) | 2.0 | 2.0 | 2.0 | 2.0 | 2.0 | 4.0 | 4.0 |
| Water contact angle (degree) | 130 | 123 | 118 | 133 | 130 | 118 | 110 |
| Water contact angle after abrasion resistance test (degree) | 110 | 102 | 103 | 97 | 92 | 115 | 105 |
| Water contact angle after heat resistance test (degree) | 129 | 123 | 120 | 132 | Spontaneous peeling | 120 | 113 |
| Abrasion resistance test after heat resistance test (degree) | 106 | 101 | 105 | 92 | — | 118 | 110 |
| Scorching mark after non-sticking test at high temperature | Slightly stained | No staining | No staining | Highly stained | Highly stained | No staining | Stained |
| State of coating film after non-sticking test at high temperature | No peeling | No peeling | No peeling | Completely peeled | Completely peeled | No peeling | No peeling |
| Infrared ray reflectance Regular reflectance at 45° (%) | 81 | 90 | 91 | 79 | 90 | 58 | 38 |

INDUSTRIAL APPLICABILITY

According to the present invention, the thin coating film of fluorine-containing polymer having heat resistance and non-sticking property can be made to adhere directly to a substrate without lowering reflection and light transmission which the substrate has.

What is claimed is:

1. A thin coating film on a substrate, said thin coating film having a thickness of not more than 0.5 $\mu$m and consisting essentially of a continuous layer of fluorine-containing polymer formed by adhering directly to a substrate, said fluorine-containing polymer in the coating film having a hydrophilic functional group and a crystalline melting point of said fluorine-containing polymer being not less than 200° C.

2. The thin coating film of claim 1, wherein the crystalline melting point of the fluorine-containing polymer in the coating film is not less than 300° C.

3. The thin coating film of claim 1, wherein the hydrophilic functional group is at least one of hydroxyl, carboxyl, salt of carboxylic acid, sulfonic acid group or salt of sulfonic acid.

4. The thin coating film of claim 1, wherein the fluorine-containing polymer having a hydrophilic functional group is a fluorine-containing polymer prepared by copolymerizing (a) 0.05 to 50% by mole of at least one of ethylenic monomers having any functional group selected from hydroxyl, carboxyl, salt of carboxylic acid, sulfonic acid group or salt of sulfonic acid with (b) 50 to 99.95% by mole of fluorine-containing ethylenic monomer which does not have said functional group.

5. The thin coating film of claim 4, wherein the ethylenic monomer (a) having functional group is at least one of fluorine-containing ethylenic monomers having any functional group selected from hydroxyl, carboxyl, salt of carboxylic acid, sulfonic acid group and salt of sulfonic acid.

6. A method of forming the thin coating film of claim 1, which comprises coating an aqueous dispersion on a substrate and sintering at a temperature of not less than a crystalline melting point of the fluorine-containing polymer contained therein, wherein the aqueous dispersion comprises 0.1 to 70% by weight of fluorine-containing polymer having a hydrophobic functional group in the form of fine particles having a particle size of 1 to 200 nm and 30 to 99.9% by weight of water.

7. A thin coating film on a substrate, said thin coating film having a total thickness of less than 3 $\mu$m and comprising at least two layers of a layer of (A) a fluorine-containing polymer having hydrophilic functional groups and a layer of (B) a fluorine-containing polymer having no functional group, where the layer of (A) is between the substrate and the layer of (B).

8. The thin coating film of claim 7, wherein a thickness of the layer of the fluorine-containing polymer having hydrophilic functional group (A) is not more than 2 μm.

9. The thin coating film of claim 7, wherein the fluorine-containing polymer having hydrophilic functional group (A) consists essentially of a continuous layer of fluorine-containing polymer formed by adhering directly to a substrate.

10. The thin coating film of claim 7, wherein the fluorine-containing polymer having hydrophilic functional group (A) has a crystalline melting point of not less than 200° C.

11. The thin coating film of claim 7, wherein the fluorine-containing polymer having hydrophilic functional group (A) has a crystalline melting point of not less than 300° C.

12. The thin coating film of claim 7, wherein the hydrophilic functional group of the polymer (A) is at least one of hydroxyl, carboxyl, salt of carboxylic acid, sulfonic acid group or salt of sulfonic acid.

13. The thin coating film of claim 7, wherein the fluorine-containing polymer having hydrophilic functional group (A) is a fluorine-containing polymer prepared by copolymerizing (a) 0.05 to 50% by mole of at least one of ethylenic monomers having any functional group selected from hydroxyl, carboxyl, salt of carboxylic acid, sulfonic acid group or salt of sulfonic acid with (b) 50 to 99.95% by mole of fluorine-containing ethylenic monomer which does not have said functional group.

14. The thin coating film of claim 13, wherein the ethylenic monomer (a) having functional group is at least one of fluorine-containing ethylenic monomers having any functional group selected from hydroxyl, carboxyl, salt of carboxylic acid, sulfonic acid group or salt of sulfonic acid.

* * * * *